Aug. 3, 1943.　　　　J. V. DYRR　　　　2,325,838
IMPLEMENT CONTROL DEVICE
Filed Aug. 31, 1942　　　3 Sheets-Sheet 3
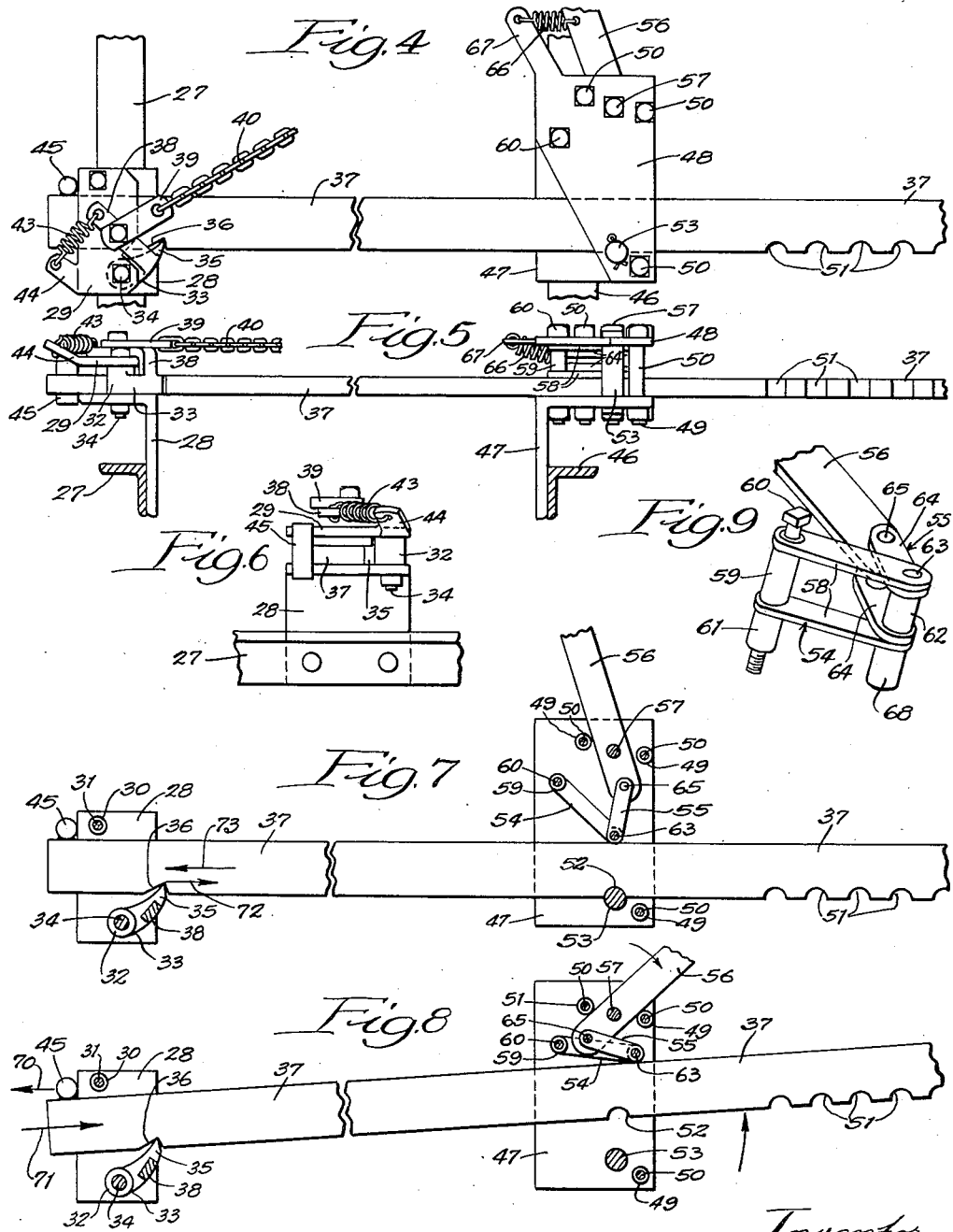
Inventor:
Jacob V. Dyrr,
By Paul O. Pippel.
Attorney.

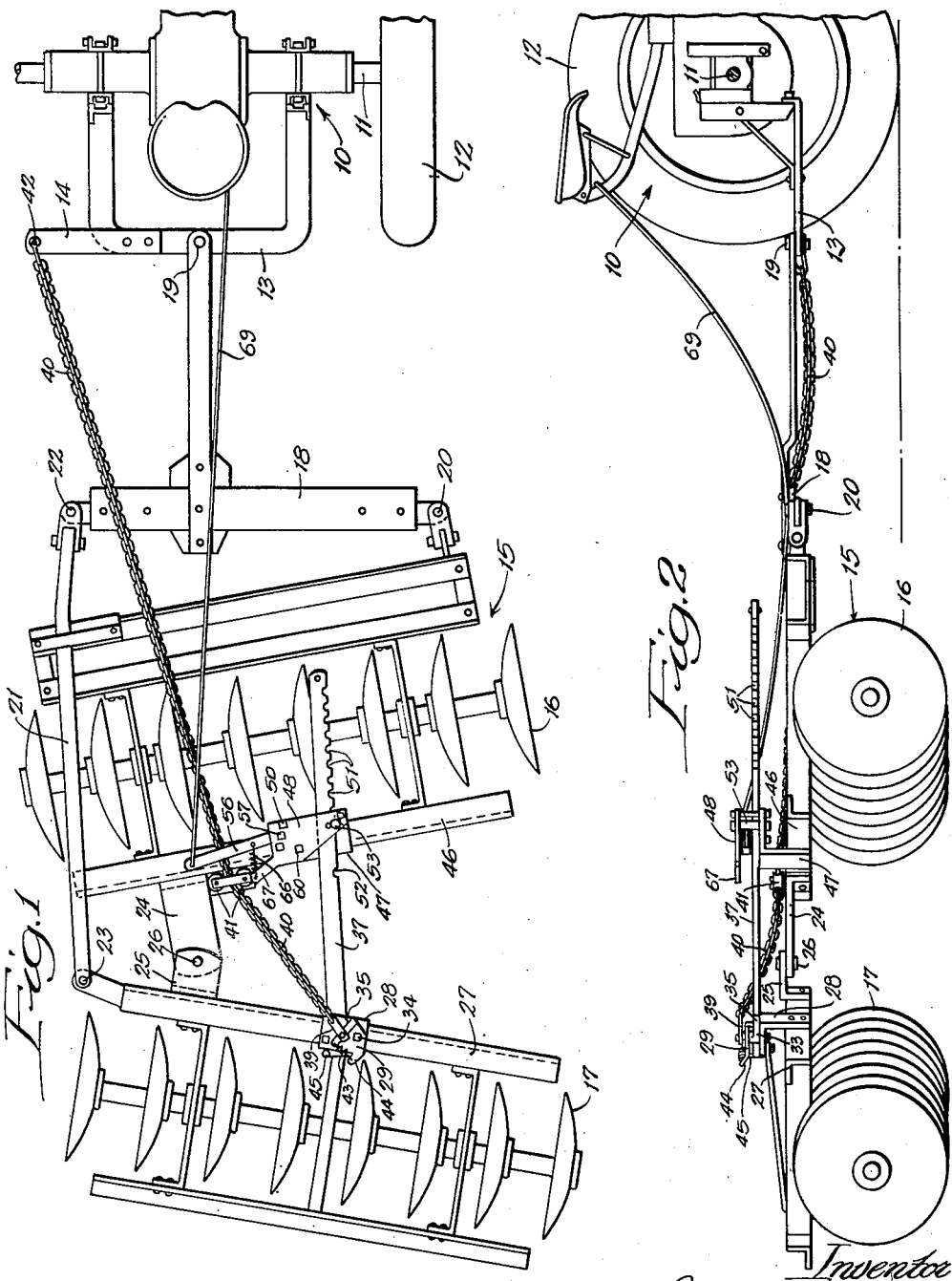

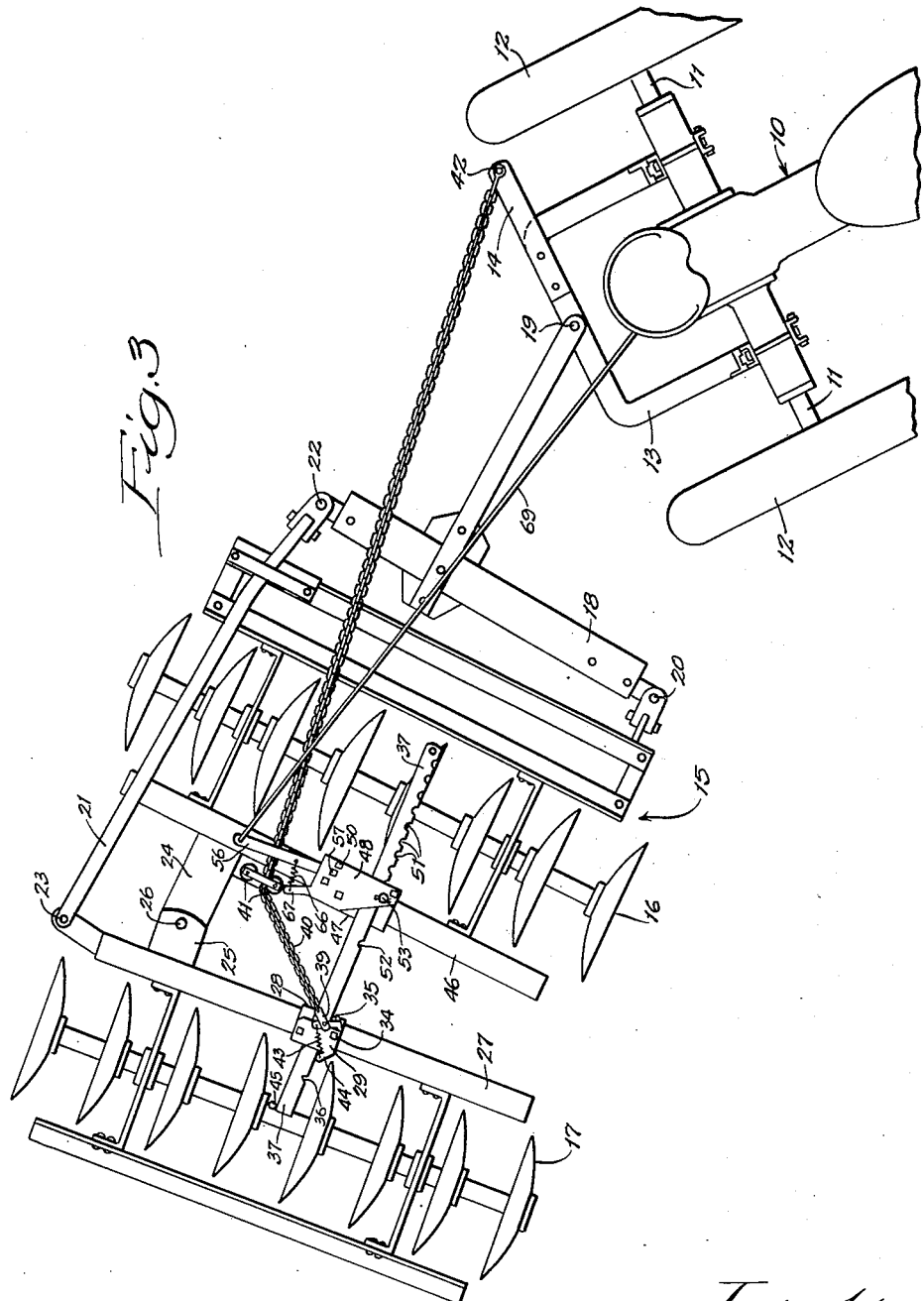

Patented Aug. 3, 1943

2,325,838

UNITED STATES PATENT OFFICE 2,325,838

IMPLEMENT CONTROL DEVICE

Jacob V. Dyrr, Bell, Calif., assignor to International Harvester Company, a corporation of New Jersey Application August 31, 1942, Serial No. 456,770

6 Claims. (Cl. 55—83)

This invention relates to an implement control device. More specifically, it relates to an arrangement for a control bar extending between the gangs of a harrow for enabling the gangs to be unlocked from one another for relative movement.

It is the usual practice in the case of offset harrows to provide a locking or control bar extending between the gangs for holding them against relative movement. When the gangs are to be shifted with respect to one an :h:-- the control bar must be unlocked or disconnected from one gang, and this unlocking operation is frequently a difficult thing.

An object of the present invention is to provide an improved harrow.

A further object is to provide an improved arrangement for regulating the control bar of a harrow.

Another object is to provide an improved means for unlocking the gangs of a harrow to permit relative movement between them.

Still another object is the provision of control means for an implement which may be easily unlocked for permitting adjustment of the implement.

Other objects will appear from the disclosure.

According to the present invention, a control bar, which extends between the front and rear gangs of an offset harrow, contacts the rear gang of the harrow in such a manner that, when a toggle lock fixing the bar to the front gang is released, the bar automatically moves out of locking engagement with the front gang, regardless of whether the force exerted upon the gangs tends to separate them or to bring them closer together.

In the drawings—

Figure 1 is a plan view of a harrow connected to a tractor, the harrow embodying the novel control bar arrangement of the present invention;

Figure 2 is a side view of the harrow in working position;

Figure 3 is a plan view of the harrow in position for a turn to the right;

Figure 4 is a detail plan view showing the novel control bar and the parts of the gangs of the harrow with which the control bar coacts;

Figure 5 is a side view, partially in section, of the parts of Figure 4;

Figure 6 is a rear elevational view showing the connection of the control bar with the rear gang;

Figure 7 is a plan view, partially in section, of the parts shown in Figure 4;

Figure 8 is a similar view, partially in section, but showing the control bar released from the front gang; and Figure 9 is a perspective view of the toggle mechanism for locking the control bar to the front gang.

Reference character 10 designates a tractor which includes a rear axle 11 and rear wheels 12. Secured to the rear axle 11 is a U-shaped drawbar 13, which has an offset extension 14. Connected to the draw-bar 13 behind the tractor 10 is a harrow 15 which includes a front gang 16, a rear gang 17, and a three-point hitch frame 18 pivotally connected at 19 to the tractor drawbar 13. The hitch frame 18 is also pivotally co..nected at 20 to the right end of the front gang 16, and a draft bar 21 is pivotally connected, as at 22, to the left end of the hitch frame 18 and also, as at 23, to the left end of the rear gang 17. Extensions 24 and 25 from the front gang 16 and the rear gang 17, respectively, are pivotally connected at 26 so as to form a pivot between the gangs. The front side of the rear gang 17 carries an angle member 27, to which is secured an upwardly extending support 28, as indicated in Figure 5. Positioned above the support 28 in spaced parallel relation thereto is a plate 29 which is separated from the support 28 at one end by a spacing sleeve 30 through which extends a securing bolt 31, as indicated in Figure 7. The plate 29 is spaced from the support 28 at the other end by a tubular portion 32 of a member 33, through which extends a securing bolt 34. The member 33 includes a locking hook 35, which engages the recess 36 in one end of a control bar 37. The member 33 also includes a control arm 38, as indicated in Figure 4, to which is connected, by means of a piece 39, a chain 40 extending between guide rollers 41 on the front gangs 16 to a point of connection 42 with the offset extension 14 of the harrow draw-bar 13. A spring 43 connected to the arm 38 of the member 33 and an offset projection 44 of the plate 29 serves to hold the member 33 in the position of Figures 4 and 7, i. e., with the locking hook 35 in engagement with the notch 36 and the control bar 37. A cylindrical piece 45 is secured to the side of the control bar 37 opposite the notch 36 and closer to the rear end thereof and, as shown in Figures 5 and 6, extends above and below the control bar so as to contact the plate 29 and the support 28.

The forward gang 16 carries an angle member 46, to which is secured, as shown in Figure 5, a support 47 somewhat similar to the support 28. A plate 48 is secured to the support 47 above and in spaced relation thereto by sleeves 49 and bolts 50, which extend through the sleeves 49. The forward end of the control bar 37 extends between the support 47 and the plate 48 and carries a series of notches 51, which determine a plurality of working positions of the harrow, and a notch 52 spaced rearwardly of the notches 51, which determines the transport position of the harrow. A pin 53 is secured to the support 47 on the plate 48 and extends therebetween, being adapted to engage any one of the notches 51 or the notch 52. Figure 7 shows the pin engaging the notch 52. The control bar 37 is held by a toggle mechanism so as to maintain the notch 52 in engagement with the pin 53. This toggle mechanism comprises a pair of links 54 and 55. The link 54 is pivotally connected to the support 47 and the plate 48 at one end and to the link 55 at the other end. The link 55 is pivotally connected to a control lever 56 pivoted at 57 between the support 47 and plate 48. The connection of the links 54 and 55 contacts the control bar 37 so that the notch 52 engages the pin 53. Figure 9 shows in somewhat greater detail the construction of the links 54 and 55, and from this it will be seen that the link 54 is formed of a pair of members 58 separated from one another by a sleeve 59, through which extends a bolt 60 serving as a support or connection to the support 47 and the plate 48. A sleeve 61 below the lower member 58 holds that lower member in spaced relation to the support 47. The parts 58 of the link 54 are also separated by a sleeve 62 upon a pin 63. The sleeve 62 also serves as a means of separation of members 64 forming the parts of the link 55. A pin 65 pivotally connects a lever 56 and the members 64 of the link 55. A spring 66 connecting the lever 56 and an extension 67 formed on the plate 48 serves to hold the lever 56 in the position shown in Figure 7, so that the links are in a position to make a lower extension 68 of the pin 63 contact the control bar 37 and hold the notch therein in engagement with the pin 53. Contact of the control lever 56 with the sleeve 49 immediately to the left of the lever 56 limits the movement of the lever in the direction in which the spring 66 urges it. When the control member 37 is to be released from the front gang 16 by release of the notches 51 or 52 from the pin 53, the lever 56 is given a clockwise movement exerted through a cord or chain 69 connected to the lever and extending to within easy reach of an operator upon the tractor. This movement of the control lever 56 brings the parts to the relative position of Figure 8, in which the control member 37 has swung to cause disengagement of the notches in the control member from the pin 53.

Normally, mere release or mere actuation of the control lever 56 and consequent movement of the links 54 and 55 from the position of Figure 7 to that of Figure 8 would be insufficient to cause the notch in the control bar 37 engaged by the pin 53 to be disengaged therefrom, for the pin would tend to stick in the notch. The novel means of the present inventon insure the positive disengagement of the notches from the pin 53 by movement of the control bar 37 from the position of Figure 7 to that of Figure 8. This is brought about by the piece 45 secured to one side of the rear end of the control bar 37 and by the hook 35 engaging the notch 36 in the other end of the control bar 37. Figure 7 shows the parts in position for transport of the harrow, since the pin 53 engages the notch 52. Let it be assumed that it is desired to move the gang parts to the working position of Figure 1. For this it is necessary that the pin 53 be disengaged from the notch 52 and be engaged with one of the notches 51, depending upon the angle of working position desired. When this is to be done, the gangs are being pulled forwardly, so that the resultant force acting upon them tends to separate them, and thus the force transmitted by the rear gang 17 to the control bar 37 is transmitted between the support 28 and plate 29 and the part 45 along a line indicated by the arrow 70. The force exerted upon the control bar 37 by the front gang is generally along a longitudinal center line of the control bar, as indicated by the arrow 71, which is offset from the point of contact between the member 45 and the support 28 and plate 29. The forces indicated by the arrows 70 and 71 are offset from one another and act in opposite directions and, thus, the tendency is to rotate the control bar 37 in a counterclockwise direction when the toggle members 54 and 55 are moved to the position of Figure 8. Thus, the forces which act upon the gangs tending to separate them insure positively the movement of the control bar such that the notch 52 is released from the pin 53, and the gangs may move to any desired working position in which the notch 51 may be engaged with the pin 53.

Now, let it be assumed that a notch 51 engages the pin 53 so that the gangs are in a working position and it is desired to shift the gangs to a transport position. In this case, the harrow is backed, so that the resultant force between the gangs tends to bring them closer to one another, and the force exerted by the rear gangs 17 is at the hook 35 in the notch 36, as indicated by the arrow 72, and the force exerted by the front gang 16 upon the control bar 37 is along the center line of the control bar, as indicated by the arrow 73. These two forces act in opposite directions along lines offset from one another and thus tend to rotate the control bar 37 in a counter-clockwise direction. Thus, when the toggle members 54 and 55 are moved to the position of Figure 8, the control member is moved positively, so that the notch 51 engaged by the pin 53 is moved out of engagement with the pin 53. Thus, the gangs may be shifted to a lesser working postion or to a transport position. From the description thus far, it will be apparent that means has been provided for assuring positive release of a control bar of a harrow from the front gang thereon so that shifting of the gangs may take place. This means includes a part connected to one side of the rear end of the harrow, so that the force transmitted by the rear gang to the control bar is offset from the center line when force is applied to the gangs tending to separate them, and also includes a notch in the other side of the bar engaged by the hook for transmitting force in the opposite direction from the rear gang to the bar when the force exerted upon the gangs tends to bring them closer together.

Incidentally, it should be observed that the hook 35 and the notch 36 form part of means by which the rear gang may be released from the control bar for shifting of the gangs to a position, as indicated in Figure 3, for a turn to the right. When, as in Figure 3, a turn to the right is to be made, turning of the tractor 10 causes a greater pull upon the chain 40 than upon the hitch 18, and the hook 35 is moved out of engagement with the notch 36. Thus, the gangs may be easily shifted to the position shown in Figure 3.

The intention is to limit the invention only within the scope of the appended claims.

What is claimed is:

1. A harrow comprising a pair of gangs connected to one another for relative movement, a control bar extending between the gangs, releasable means acting against one side of the bar at one end thereof to hold the bar against relative movement with respect to one gang by engagement of the other side of the bar at the said one end thereof with the gang, means causing application of force tending to separate the gangs to make the other gang act against the one side of the bar at the other end thereof for making the said one end of the bar swing away from the said other side thereof to disengage said other side from the said one gang upon release of the releasable means, and means causing application of force tending to bring the gangs together to make said other gang act against said other side of the bar at the said other end thereof for making the said one end of the bar swing away from the said other side thereof to disengage said other side from the said one gang upon release of the releasable means.

2. A harrow comprising a pair of gangs connected for relative movement, a control bar extending between the gangs and having at one side adjacent one end a plurality of portions engageable with one gang to fix the gangs in a plurality of relative positions, releasable means for holding any of the portions in engagement with the said one gang, means causing application of force tending to separate the gangs to make the other gang act against the other side of the bar at the other end thereof for making the said one end of the bar swing away from the said one side thereof to disengage the said portions from the said one gang upon release of the releasable means, and means causing application of force tending to bring the gangs together to make the other gang act against the said one side of the bar at the said other end thereof for making the said one end of the bar swing away from the said one side thereof to disengage the said portions from the said one gang upon release of the releasable means.

3. A harrow comprising a pair of gangs connected to one another for relative movement, a control bar extending between the gangs, releasable means acting against one side of the bar at one end thereof to hold the bar against relative movement with respect to the gang by engagement of the other side of the bar at the said one end thereof with the gang, a projection secured to the said one side of the bar at the other end thereof for engaging the other gang upon application of force tending to separate the gangs for making the said one end of the bar swing away from the said other side thereof to disengage said other side from the said one gang upon release of the releasable means, and a member connected to the said other gang for engaging the said other side of the bar at the said other end thereof upon application of force tending to bring the gangs together for making the said one end of the bar swing away from the said other side thereof to disengage said other side from the said one gang upon release of the releasable means.

4. A harrow comprising a pair of gangs connected together for relative movement, a control bar extending between the gangs and having at one side adjacent one end a plurality of notches, a notch at the said one side adjacent the other end, and a projection extending from the other side adjacent the said other end of the bar, releasable means for holding one gang in engagement with any of the plurality of the notches, means connected with the other gang for engaging the projection at the said other end of the bar upon application of force tending to separate the gangs for making the said one end of the bar swing away from the said one side thereof to disengage any of the notches from the said one gang upon release of the releasable means, and means connected with the said other gang for engaging the notch at the said other end upon application of force tending to bring the gangs closer together for making the said one end of the bar swing away from the said one side thereof to disengage any of the notches from the said one gang upon release of the releasable means.

5. An offset harrow comprising a pair of gangs connected to one another so as to be capable of turning in one direction in working position, a control bar extending between the gangs and having a plurality of notches at one side adjacent one end engageable with one gang to maintain the gangs in a transport position or in a plurality of working positions, releasable means for holding the notches in engagement with the said one gang, a notch in the said one side of the bar adjacent the other end thereof, and an offset projection at the other side of the bar adjacent the said other end thereof, a releasable latch member engaging the notch in the said other end of the bar and mounted on the other gang so as to be releasable from the said notch for permitting the gangs to move to a relative position permitting turning of the harrow in a direction opposite to the said one direction, said latch member during engagement with the notch and application of force in a direction to bring the gangs together causing the said one end of the bar to swing away from the said one side thereof to disengage the notches from the said one gang upon release of the releasable holding means, and means connected with the said other gang and engaging the offset projection on the said other end of the bar to limit the movement of the gangs away from one another in working position and causing upon application of force tending to separate the gangs the said one end of the bar to move away from the said one side thereof to disengage the notches in the said one end of the bar from the one gang upon release of the releasable holding means.

6. An implement comprising a pair of tools connected to one another for relative movement, a control bar extending between the tools, releasable means acting against one side of the bar at one end thereof to hold the bar against relative movement with respect to one tool by engagement of the other side of the bar at the said one end thereof with the tool, means causing application of force tending to separate the tools to make the other tool act against the one side of the bar at the other end thereof for making the said one end of the bar swing away from the said other side thereof to disengage said other side from the said one gang upon release of the releasable means, and means causing application of force tending to bring the tools together to make said other tool act against said other side of the bar at the said other end thereof for making the said one end of the bar swing away from the said other side thereof to disengage said other side from the said one tool upon release of the releasable means.

JACOB V. DYRR.